(12) United States Patent
Donadini et al.

(10) Patent No.: US 12,145,531 B2
(45) Date of Patent: Nov. 19, 2024

(54) ELECTRONIC KEY

(71) Applicant: SILCA S.P.A., Vittorio Veneto (IT)

(72) Inventors: Michele Donadini, Vittorio Veneto (IT);
Maurizio Ugel, Vittorio Veneto (IT);
Nicola Tona, Vittorio Veneto (IT);
Marco De Gregorio, Vittorio Veneto (IT); Paolo Cavarzere, Vittorio Veneto (IT)

(73) Assignee: SILCA S.P.A., Vittorio Veneto (IT)

( * ) Notice: Subject to any disclaimer, the term of this patent is extended or adjusted under 35 U.S.C. 154(b) by 182 days.

(21) Appl. No.: 17/794,927

(22) PCT Filed: Jan. 27, 2021

(86) PCT No.: PCT/IB2021/050615
§ 371 (c)(1),
(2) Date: Jul. 22, 2022

(87) PCT Pub. No.: WO2021/152469
PCT Pub. Date: Aug. 5, 2021

(65) Prior Publication Data
US 2023/0137301 A1 May 4, 2023

(30) Foreign Application Priority Data

Jan. 28, 2020 (IT) .................. 102020000001585

(51) Int. Cl.
*B60R 25/24* (2013.01)
*B60R 25/04* (2013.01)
*G07C 9/00* (2020.01)

(52) U.S. Cl.
CPC ............ *B60R 25/241* (2013.01); *B60R 25/04* (2013.01); *G07C 9/00309* (2013.01); *B60R 2325/10* (2013.01)

(58) Field of Classification Search
None
See application file for complete search history.

(56) References Cited

U.S. PATENT DOCUMENTS 10,293,787 B2 * 5/2019 Brombach .............. B60R 25/25
10,589,719 B1 * 3/2020 Sohn ..................... B60R 25/241
(Continued)

FOREIGN PATENT DOCUMENTS

DE      102012111361 A1     5/2014

OTHER PUBLICATIONS

Braxton et al., SecFob: A Remote Keyless Entry Security Solution, 2023, IEEE Xplore, 979-8-3503-9775-8/23 (Year: 2023).*
(Continued)

*Primary Examiner* — Carlos Garcia
(74) *Attorney, Agent, or Firm* — Carmel Patent Agency; Robert Ballarini

(57) ABSTRACT

Electronic key for a motor vehicle having a containment casing, which houses:
at least one processing and/or control unit,
at least one memory unit where at least one recognition data is stored to control at least one function and/or system of a motor vehicle,
at least one transmitter and/or transceiver unit to communicate with at least one control unit which is mounted in/on said motor vehicle and which is configured to command, following the receipt of the recognition data, at least one functionality and/or system of the vehicle,
at least one receiver/transceiver which is connected to the processing and/or control unit and is configured to receive at least one command signal directly from the outside. The processing and/or control unit is configured so that, upon receipt of the command signal directly from the outside, intervenes on at least one of the components of the key itself.

17 Claims, 5 Drawing Sheets

(56) References Cited

U.S. PATENT DOCUMENTS

| | | | |
|---|---|---|---|
| 2013/0317693 A1* | 11/2013 | Jefferies | G07B 15/00 |
| | | | 701/31.5 |
| 2018/0262336 A1* | 9/2018 | Fujiwara | H04L 9/321 |
| 2019/0092282 A1 | 3/2019 | Stanfield et al. | |
| 2019/0122469 A1* | 4/2019 | Fujiwara | G07C 9/00309 |

OTHER PUBLICATIONS

Geeth et al., RFID-Based Anti-theft Auto Security System with an Immobilizer, 2007, IEEE Xplore, 1-4244-1152-1/07 (Year: 2007).*

* cited by examiner

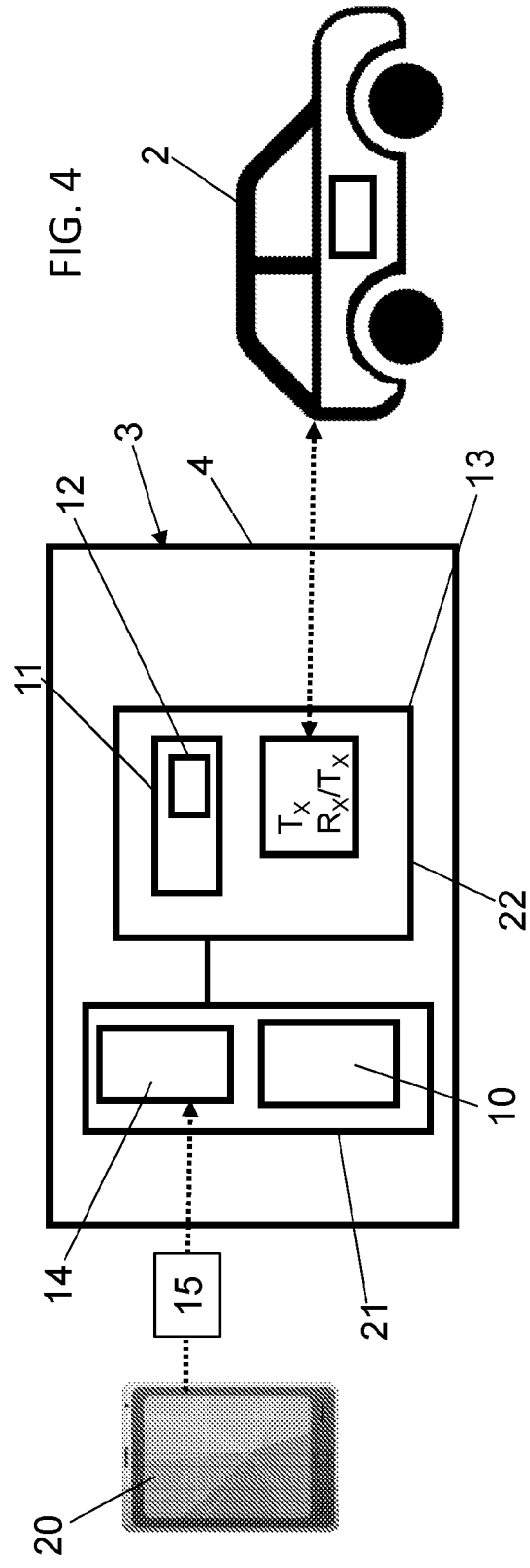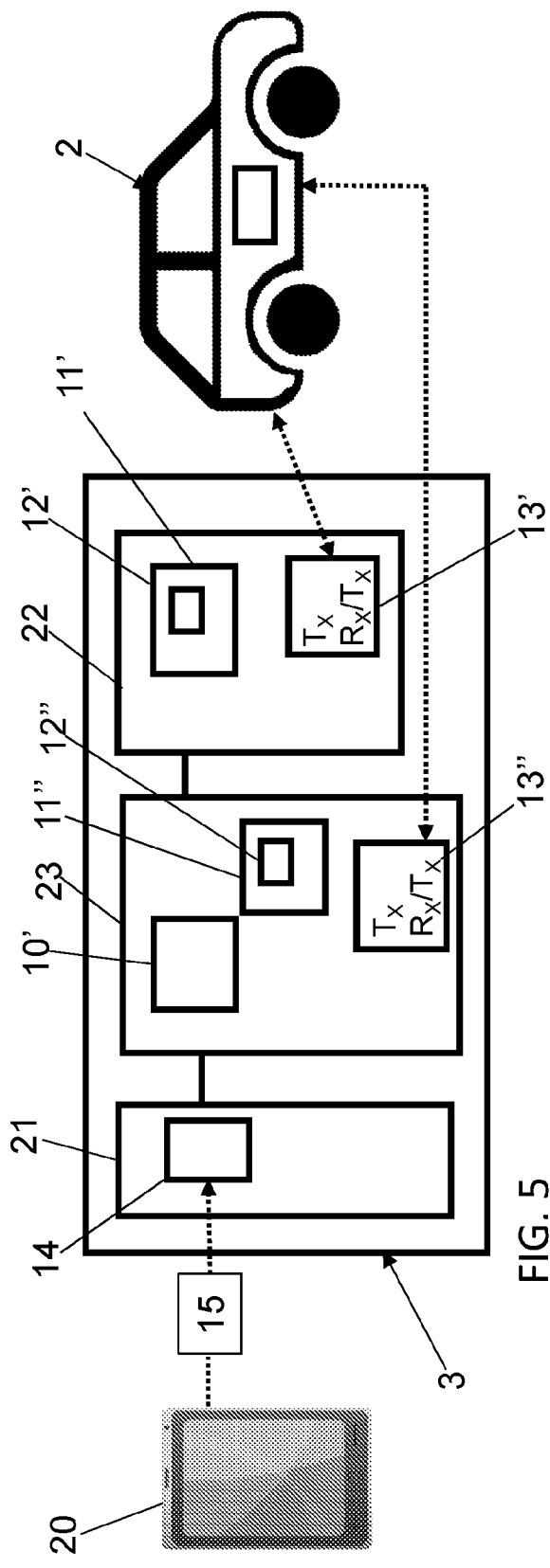

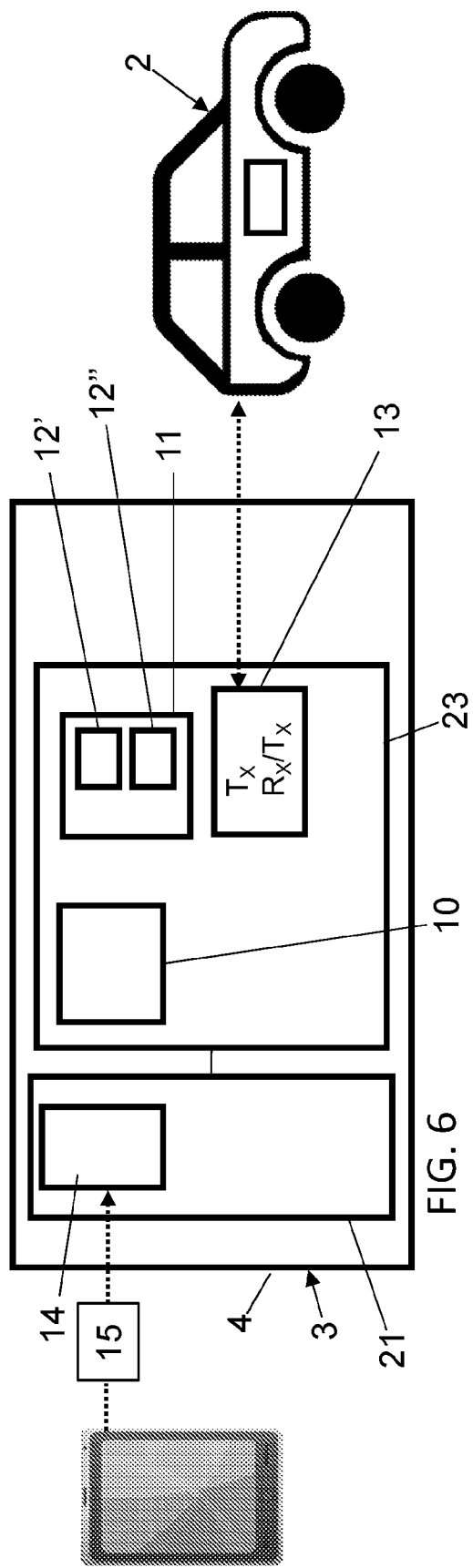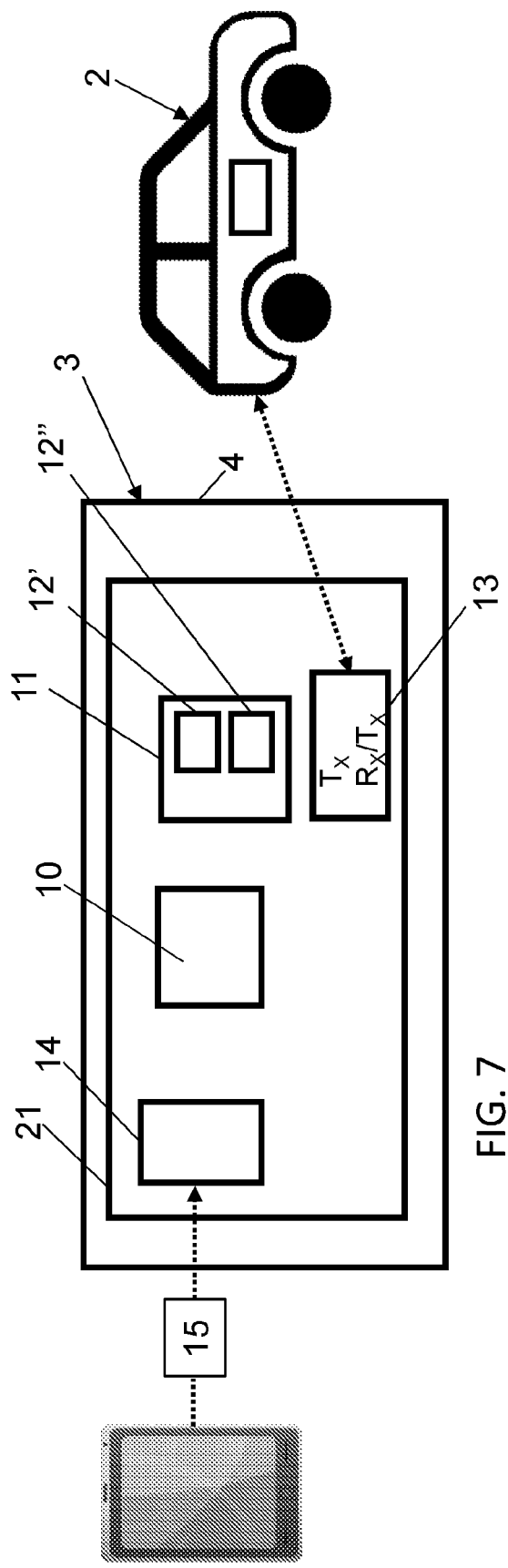

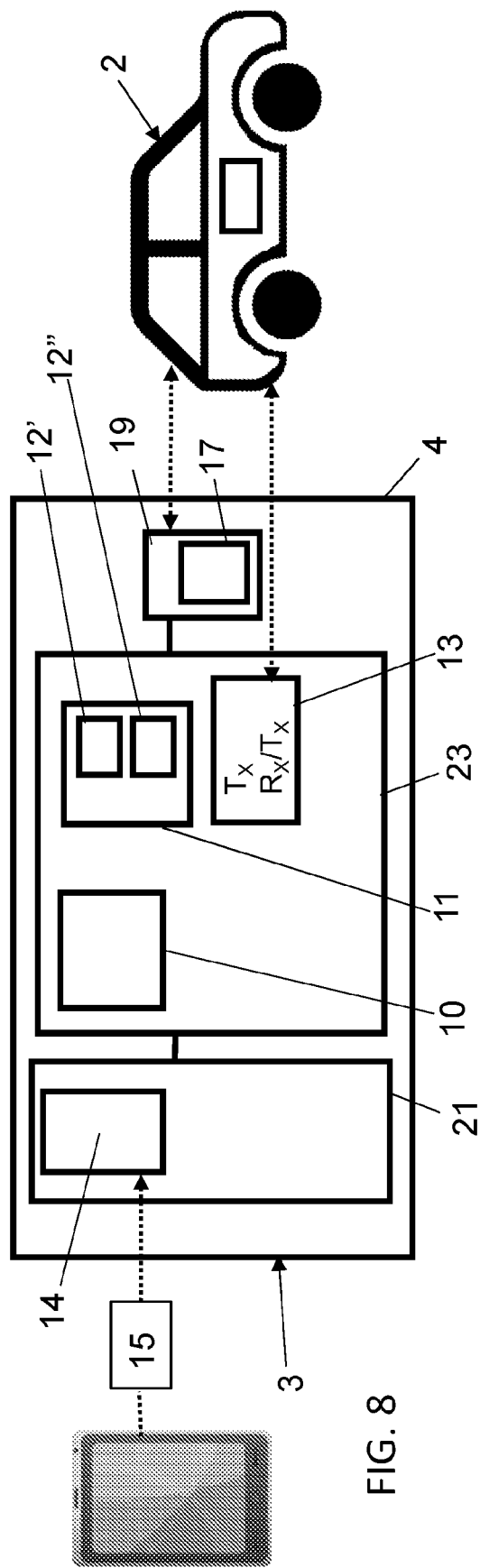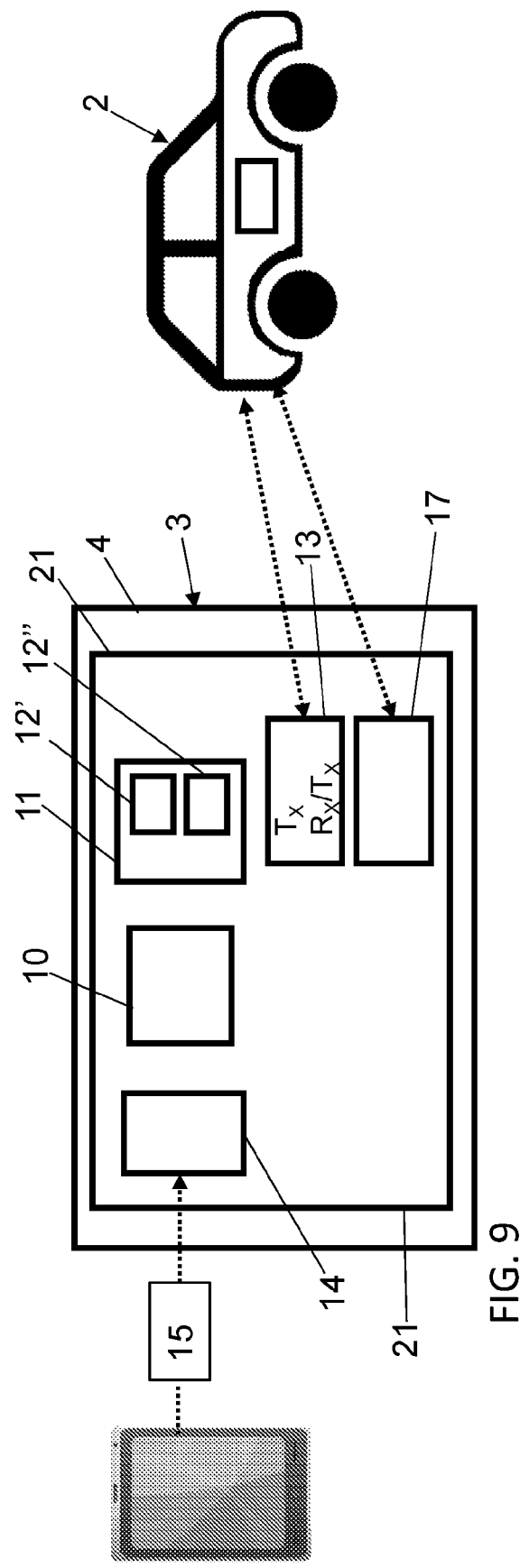

ELECTRONIC KEY

FIELD OF THE INVENTION

The present invention relates to an improved electronic key for the use of a motor vehicle, preferably to be able to manage the temporary use of a motor vehicle, and in particular in order to unlock the vehicle doors and/or in order to switch on its engine. The present invention also relates to a method for enabling/authorizing an electronic key for the use of a motor vehicle, a method for managing the temporary use of a motor vehicle. The present invention also relates to an infrastructure for managing the use of a plurality of motor vehicles, in particular by subjects different from the owner/s of said motor vehicles.

BACKGROUND

In some contexts, there is a need to authorize a specific subject for the temporary use of a vehicle. In particular, this need arises for example in the case of a car rental to authorize a specific customer to use a vehicle from the fleet of vehicles managed by the car rental itself, or in the case of a fleet of company cars to authorize an employee to use a vehicle. of the company fleet. Conveniently, this need also arises in the case of "car-sharing", that is when a private subject makes his vehicle available so that a previously authorized third party can use it temporarily.

More specifically, currently, the authorization procedure for the use of a vehicle is aimed at delivering the key or keys to unlock the doors of the vehicle itself, and thus allow access to the interior of the latter, and also to start the car engine.

Currently, this authorization procedure generally requires that the user, who needs to temporarily use the vehicle, physically goes to a dedicated counter/desk or shop where an operator of the fleet manager proceeds—before the delivery of the key(s) specifically provided for to use a specific vehicle—to carry out a laborious administrative and bureaucratic process. Therefore, only after having collected the key(s), can the user physically go to the vehicle in order to be able to use it, in particular in order to unlock the doors to access the passenger compartment and then be able to switch on the vehicle. motor vehicle engine.

It is easy to understand how this procedure is particularly inconvenient in terms of time and costs, in particular given the fact that the user must physically go to a counter/desk or shop to collect the key(s), as well as the fact that requires the manager to have dedicated operators available to deliver the key(s).

To speed up and streamline the authorization procedure, solutions have already been proposed in which the user who needs to temporarily use the vehicle, after registering online, uses his smartphone instead of the key to unlock the vehicle doors and to start the engine of the latter. In particular, for this purpose, the smartphone is configured to send signals to the control unit of the vehicle and/or to communicate with said control unit, and this in order to unlock the doors of the vehicle itself and/or to turn on the engine of the vehicle itself.

Other solutions even provide for the provision, inside the vehicle, of a robot for unlocking the doors from inside the vehicle itself following the remote reception of an authorization signal; the traditional ignition key is instead located inside a safe inside the vehicle and can be opened once the user has entered the vehicle, by sending a specific signal from the smartphone or through a card.

However, all these solutions are rather complicated since they require the installation of dedicated and suitably configured control units in the vehicle. Furthermore, these solutions require to intervene in a particularly invasive way on the motor vehicle, for example by installing a reader for receiving wireless signals to be sent then—by means of a suitable wiring—to the motor vehicle control unit.

Basically, all these known solutions can be used with vehicles that are already specially made by manufacturers with certain characteristics, or can be used with traditional vehicles that have however been specifically modified to be used in a context in which a user is temporarily authorized to use of such vehicles. Furthermore, a different intervention—in particular cabling—is generally envisaged for each model of vehicle.

For example, DE102012111361 describes a solution in which a traditional key equipped with a transponder can pass from a deactivated state (in which it is not able to unlock the immobilizer connected to the ignition of the vehicle) to an activated state (in which it is in able to unlock the immobilizer connected to the ignition of the vehicle) following the receipt of a corresponding signal sent by an activation device, which is mounted/provided inside the vehicle and which is connected by cable to a control which is also mounted/provided inside the vehicle. In the DE102012111361 solution it is always and only the control module, which is mounted/provided inside the vehicle, that receives activation commands from the outside, and in particular these commands are received directly from a remote server or from a smartphone. More in detail, the control module receives from the outside the command signal for opening the doors and the command signal for activating the key, which is transmitted via cable to the activation device and it is then the latter that sends a corresponding signal to the key to make it pass from the deactivated to the activated state in which it is able to unlock the immobilizer connected to the ignition of the vehicle. Therefore, the solution of DE102012111361 requires to intervene directly on the motor vehicle by installing the control module and the activation device, as well as arranging an appropriate wiring to connect them together.

US2019/0092282 describes a kit to be coupled to a traditional key provided with the transponder only. In particular, this kit includes an additional dedicated component to prevent or disturb wireless data transmission from the traditional key transponder to the vehicle.

Furthermore, the known solutions in which the traditional mechanical or electronic key remains always active—that is, it is always suitable for unlocking the vehicle doors and/or starting the engine of the latter—are not optimal from the point of view of safety given that, once the user has got hold of the key, there is no longer any control over the key itself, and therefore not even over the use of the vehicle. It is easy to see how an attacker could misuse this situation.

SUMMARY

The purpose of the present invention is to propose an electronic key, a method and/or an infrastructure to allow the use of a motor vehicle, in particular to unlock its doors, in particular in order to allow access to its interior, and/or for starting its engine, which eliminate the aforementioned drawbacks present in the traditional technique.

Another object of the invention is to propose an electronic key, a method and/or an infrastructure which does not require the user to physically go to a counter/desk and/or shop to collect the vehicle key.

Another purpose of the invention is to propose an electronic key, a method and/or an infrastructure which are more secure than traditional solutions.

Another object of the invention is to propose an electronic key, a method and/or an infrastructure that does not require any substantial intervention on the motor vehicle, and in particular on the motor vehicle control unit.

Another object of the invention is to propose an electronic key, a method and/or an infrastructure that can also be used with motor vehicles already available on the market.

Another purpose of the invention is to propose an electronic key, a method and/or an infrastructure with an alternative characterization, both in functional and implementation terms, with respect to traditional ones.

Another purpose of the invention is to propose an electronic key, a method and/or an infrastructure which are improvements and/or alternatives to traditional ones.

Another object of the invention is to propose an electronic key, a method and/or an infrastructure that can be implemented in a simple, quick and low-cost way.

Another purpose of the invention is to propose an electronic key suitable for use in a context in which there is a need to temporarily enable/authorize a user to use a motor vehicle, in particular to unlock the doors of the motor vehicle and/or to start the engine of the latter.

Another object of the invention is to propose an electronic key which is particularly safe and which can be obtained in a simple, rapid and low-cost manner.

All these objects and others that will result from the following description are achieved, according to the invention, with an electronic key, with the infrastructure and with a method having the characteristics indicated in the appended claims.

BRIEF DESCRIPTION OF THE DRAWINGS

The present invention is further clarified hereinafter in some of its preferred embodiments reported for purely illustrative and non-limiting purposes with reference to the attached drawings, in which:

FIG. 4 shows a schematic view a first embodiment of the electronic key according to the invention, FIG. 5 shows a schematic view a second embodiment of the electronic key according to the invention, FIG. 6 shows a schematic view of a third embodiment of the electronic key according to the invention, FIG. 7 shows a schematic view a fourth embodiment of the electronic key according to the invention, FIG. 8 shows a schematic view a fifth embodiment of the electronic key according to invention, and FIG. 9 shows a schematic view a sixth embodiment of the electronic key according to the invention.

DETAILED DESCRIPTION OF THE PREFERRED EMBODIMENTS

Figure 1:
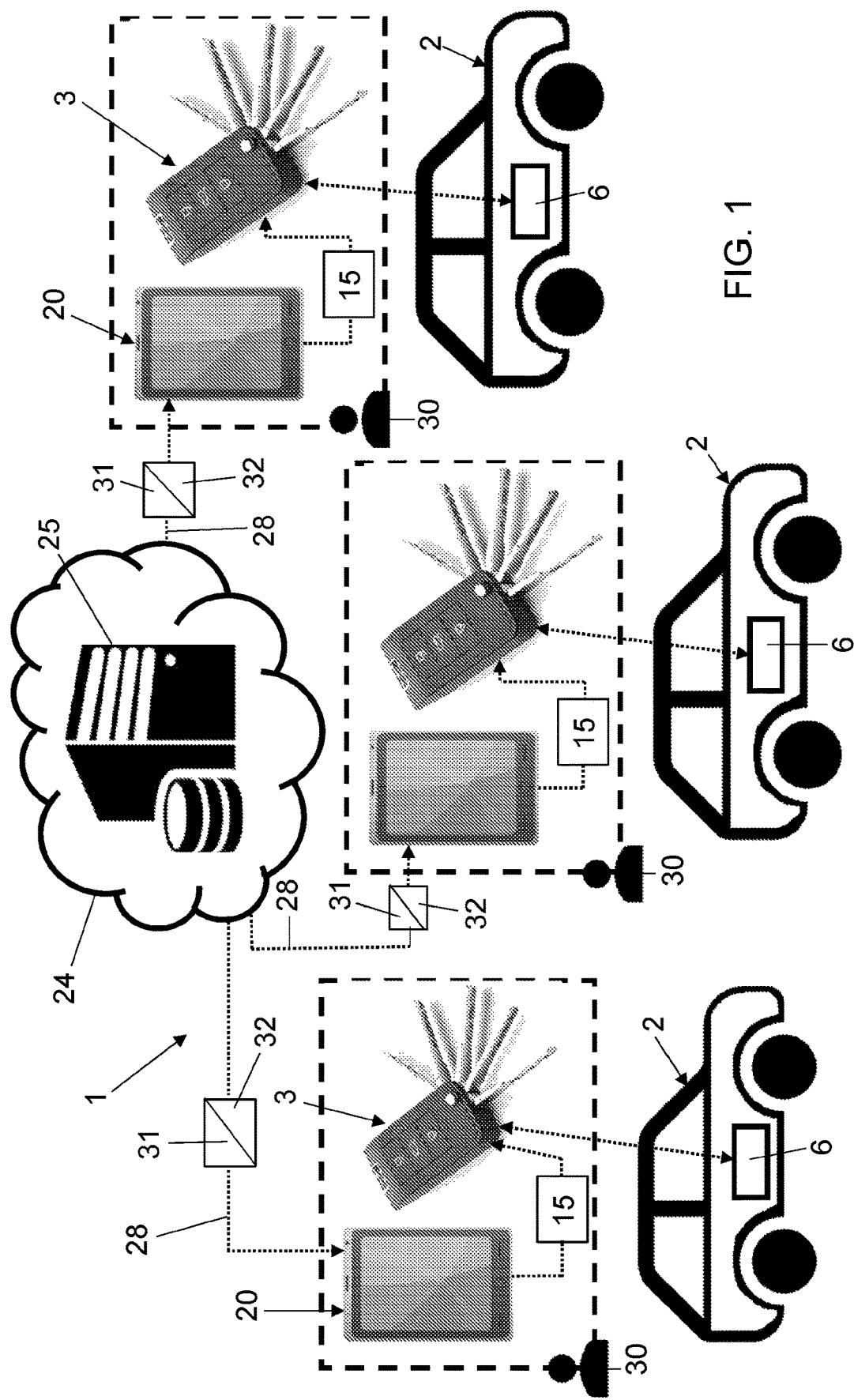
FIG. 1 shows a schematic view of the infrastructure according to the invention.
Figure 2:
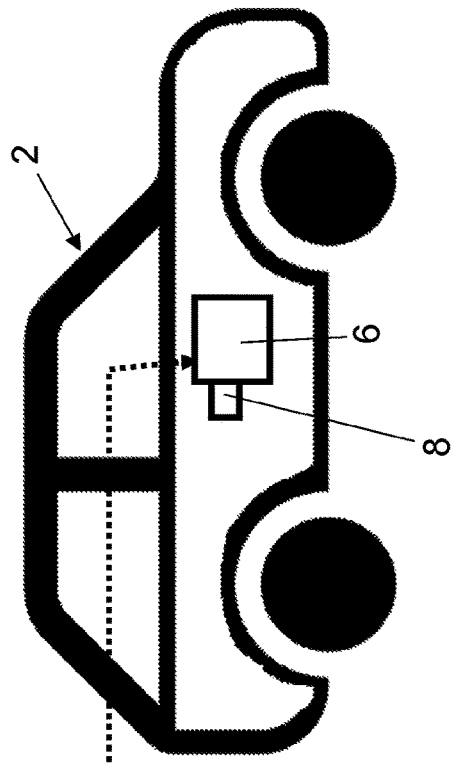
FIG. 2 shows a schematic view of a detail of the infrastructure according to the invention.
Figure 2:
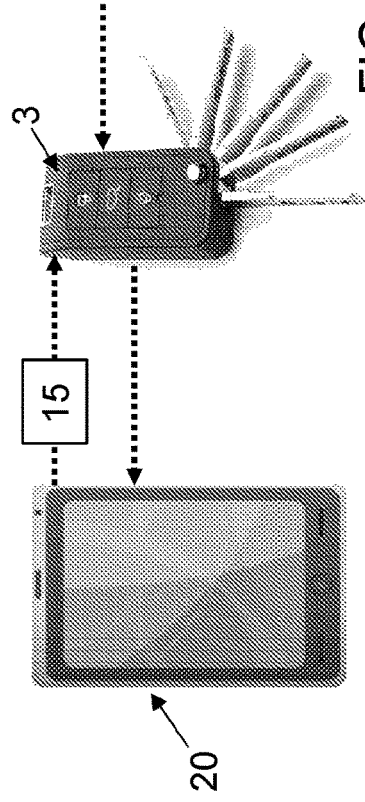
Figure 3:
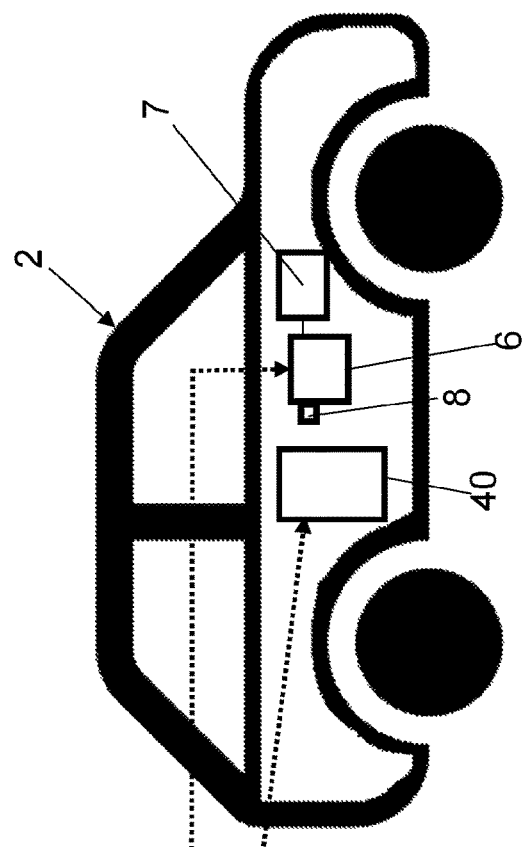
FIG. 3 shows a schematic view a variant of the detail of FIG. 2.
Figure 3:
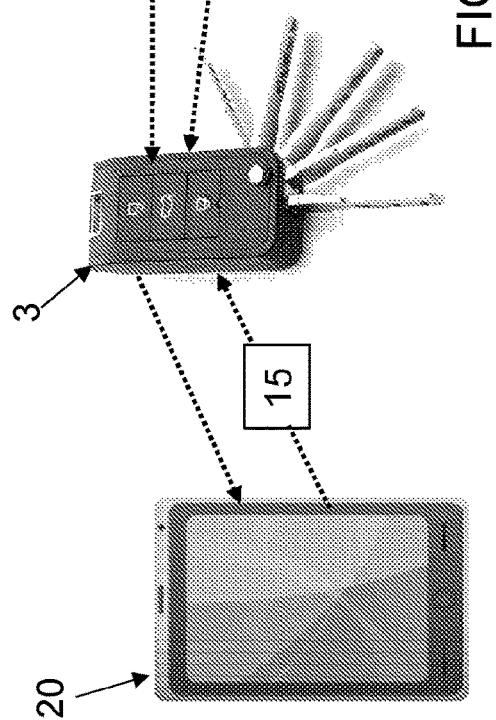

The present invention relates to an electronic key 3, in particular of the type envisaged and configured for the use of a motor vehicle, preferably to be able to manage the temporary use of a motor vehicle 2, and—in more detail—in order to unlock the doors of said vehicle and/or in order to start its engine.

In particular, the electronic key 3 according to the invention is provided with a containment casing 4. Conveniently, the electronic key 3 comprises, housed inside the same containment casing 4, the following components:

at least one processing and/or control unit 10, at least a memory unit 11 in which at least one recognition data 12 is stored to control at least one function and/or system of the motor vehicle 2, preferably the system for allowing/unlocking the ignition of the motor vehicle engine and/or for allowing/unlocking the opening of at least one vehicle door;

at least one transmitting and/or transceiver unit 13 to communicate with at least one control unit 6 provided for/mounted in/on a motor vehicle 2;

at least one receiver and/or transceiver 14 (preferably a transceiver) which is connected with said at least one processing and/or control unit 10 and is configured to receive a command signal 15 from the outside.

Preferably, the electronic key 3 consists exclusively of the aforementioned components, i.e., it does not contain further dedicated components inside the containment casing 4.

Conveniently, said at least one control unit 6 of the motor vehicle can comprise the electronic control unit of the engine (said "ECM") and/or the immobilizer and/or one or more electronic control units (ECUs) incorporated in the system to be controlled. Conveniently, said at least one control unit 6 is configured to control at least one function and/or system of the motor vehicle 2, in particular it is configured to control the unlocking of the ignition of the motor vehicle engine and/or the unlocking of the opening of at least one vehicle door, following the reception of said at least one identification data of a given key 3. More in detail, each control unit 6 contains or is associated with at least one identification data of a given key 3.

The processing unit and/or control 10 of the key 3 is configured so that, upon receipt—by means of said at least one receiver/transceiver 14—of said command signal 15 directly from the outside, it intervenes on at least one component of the key itself so as to make it pass from an enabled state to a disabled state, and/or vice versa.

Conveniently, the command signal 15 is sent directly from the outside in the sense that it is sent to said at least one receiver/transceiver 14 of the key 3, without using or passing through stages or intermediate devices, from a unit and/or a device which is/are functionally and structurally independent from the vehicle.

Conveniently, the command signal 15 is sent from the outside in the sense that it is sent to the key by an external device, preferably portable, which is provided with its own power supply means (in particular it has its own power supply battery), and which is therefore independent of the motor vehicle from the point of view of electrical power supply and at the most can be temporarily and removably connected to the motor vehicle to recharge its power supply means.

Conveniently, the receiver/transceiver 14 is configured to receive a command signal 15 directly from the outside. Preferably, the command signal 15, which is sent to said at least one receiver/transceiver 14 of the key 3, is disconnected from the state of the vehicle and, in particular, it is independent of any communication that occurs directly between an external unit and the vehicle itself. Advantageously, in the solution according to the invention, the vehicle is and always remains in a state enabled for communication with the key, while it is only the key that can change state and pass from an enabled state to a disabled state, and/or vice versa.

Advantageously, the command signal 15 is sent from an external device, in particular from a mobile device 20, directly to the receiver/transceiver 14, without the presence of other stages and/or intermediate devices.

Conveniently, the term "directly" here means that the command signal 15 is sent from outside the electronic key and is received by the latter, in particular by the receiver/transceiver 14, preferably by means of communication, preferably wireless and in particular without the need to communicate with a device that is mounted/installed inside the vehicle, nor with the need to previously couple the electronic key with the vehicle itself.

In this way, the command signal 15 passes directly from an external device, which is structurally and functionally independent from the vehicle, to the key 3 and acts only on said key, making it pass from the disabled state to the enabled state, or vice versa, thus avoiding having to carry out dedicated or specific interventions or modifications on board the vehicle, and in particular on its control unit, as well as avoiding installing additional dedicated devices or components in the vehicle.

Conveniently, in the solution according to the present invention, in order to control at least one functionality and/or system of the motor vehicle 2, in particular in order to control the release of the ignition of the motor vehicle engine and/or the release of the opening of at least one door of the motor vehicle, no direct communication is provided between the motor vehicle (and in particular between its control unit 6) and an external device independent of the motor vehicle itself.

In particular, the key 3 is in an "enabled state" when it is able to communicate with said at least one control unit 6 of the motor vehicle 2 and also when it communicates the correct recognition data 12 to said control unit, thus allowing the control unit itself to successfully command at least one function and/or system of the motor vehicle 2, and in particular in order to allow/unlock the opening of at least one door of the motor vehicle and/or in order to allow/unlock the ignition of the engine of the motor vehicle.

On the contrary, the key 3 is in a "disabled state" when it is unable to communicate with said at least one control unit 6 of the motor vehicle 2 and/or does not communicate the correct recognition data 12 to said control unit, thus preventing the control unit itself to successfully command at least one function and/or system of the motor vehicle 2, and in particular when it is unable to allow/unlock the opening of at least one vehicle door and/or to allow/unlock the ignition of the motor vehicle engine.

Conveniently, the control unit 6 of the motor vehicle 2 is and always remains configured in the same way (i.e., in an enabled state), in the sense that—upon receipt of the correct recognition data 12 by the key—it always successfully commands at least one function and/or system of motor vehicle 2; what varies is the status of key 3, in the sense that—when it is in the disabled status—it is unable to communicate with the control unit and/or communicates to the latter an incorrect recognition data, for example different and/or incomplete.

Advantageously, to make the key 3 pass from the enabled state to the disabled state, the processing and/or control unit 10 is configured so that—upon receipt of at least one command signal 15 from the outside—it performs an erase operation (at least partial) and/or a modification of the configuration and/or of the connections and/or of the data present and/or used by said at least one processing and/or control unit 10 and/or by said at least one memory 11 and/or from said at least one transmitting and/or transceiver unit 13 and/or from said receiver/transceiver 14.

Preferably, to switch the key 3 from the enabled state to the disabled state, the processing and/or control unit 10 is configured so that—upon receipt of at least one command signal 15 from the outside—it performs one or more of the following operations:

erases and/or modifies, at least in part, from the memory unit 11 at least part of the recognition data 12, deletes and/or modifies, at least in part, one or more instructions of the firmware of the memory unit 11 and/or of the processing and/or control unit 10 and/or of the transmission/transceiver unit 13 and/or said receiver/transceiver 14, interrupts and/or modifies the electrical connections (tracks) of the electronic circuit of the memory unit 11 and/or of the processing and/or control unit 10 and/or of the transmission/transceiver unit 13 and/or of said receiver/transceiver 14, and/or between said units.

Conveniently, said recognition data 12 can comprise a coded sequence 12' to unlock the opening of the motor vehicle doors and/or a secret key 12" to allow its engine to be switched on.

More in detail, the operations to switch the key from the enabled state to the disabled state include—for example—one or more of the following operations:

cancellation or modification of the coded sequence 12' to allow/unlock the opening of the vehicle doors 2 or of the secret key 12" which allows the ignition of the engine, both present in the memory unit 11, cancellation or modification of the section of code or routine or procedure which allows to recover the recognition data 12 from the memory unit 11 and to send it to the control unit 6 of the motor vehicle 2, disabling the sending of the recognition data 12 on the basis of the value of a firmware and/or software parameter that can be modified by the processing and/or control unit 10 on the basis of instructions received from the mobile device 20 or from a remote unit 24 through the mobile device 20 (i.e., a conditional transmission of data 12), physical interruption of the stretch of track of one or more antennas, of the transmitter and/or transceiver unit 13, which allows to send the recognition data 12 from the memory unit 11 to the control unit 6 of the motor vehicle 2 through the opening of a circuit in charge controlled by one of the pins ("outputs") of the processing and/or control unit 10, switching off the transmitter and/or transceiver unit 13 (preferably defined by an RF transceiver) by opening a circuit in charge controlled by one of the pins ("outputs") of the processing and/or control unit 10.

Correspondingly, to make the key 3 pass from the disabled state to the enabled state, the processing and/or control unit 10 is configured so that—upon receipt of at least one command signal 15 from the outside—it restores the configuration and/or connections and/or data present and/or used by said at least one processing and/or control unit 10 and/or by said at least one memory unit 11 and/or by said at least one transmitting and/or transceiver unit 13 and/or by said receiver/transceiver 14.

Conveniently, said external control signal 15 for passing the key 3 from the disabled state to the enabled state can contain internally information or data relating to what has been previously deleted or modified, or also related to specific configurations to be set or instructions to be executed.

Preferably, the command signal 15 is a dedicated signal for causing only the passage of the key from the disabled state to the enabled state, or vice versa, and does not correspond and does not contain (not even partially) any activation signal to command a function and/or system of the motor vehicle, for example to allow/unlock the ignition of the engine of said motor vehicle and/or to allow/unlock the opening of at least one door of the motor vehicle.

Conveniently, the reset command signal commands the performance of one or more operations which—correspondingly—are inverse with respect to those operated during the previous disabling. More specifically, the operations to switch the key from the disabled to the enabled state include—for example—one or more of the following operations:

reception and restoration of the coded sequence 12' to allow/unlock the opening of the vehicle doors 2 or of the secret key 12" which allows the ignition of the engine, both present in the memory unit 11, reception and restoration of the correct section of code (firmware) or routine or procedure which allows to recover the recognition data 12 from the memory unit 11 and to send it to the control unit 6 of the motor vehicle 2, enabling the sending of the recognition data 12 on the basis of the value of a firmware and/or software parameter that can be modified by the processing and/or control unit 10 on the basis of instructions received from the mobile device 20 or from the remote unit 24 through the mobile device 20 (i.e., conditional sending of the recognition data 12), restoration of the stretch of track of one or more antennas, of the transmitter and/or transceiver unit 13, which allow to send the recognition data 12 from the memory unit 11 to the control unit 6 of the motor vehicle 2 by closing a suitable circuit controlled by one of the pins ("outputs") of the processing and/or control unit 10, switching on of the transmitter and/or transceiver unit 13 (preferably defined by an RF transceiver) by closing a circuit in charge commanded by one of the pins ("outputs") of the processing and/or control unit 10.

Advantageously, to switch from the enabled state to the disabled state of the key 3, or vice versa, said at least one processing and/or control unit 10 acts exclusively on the same processing and/or control unit 10 and/or on said at least one memory unit 11 and/or on said at least one transmitter and/or transceiver unit 13 and/or on said receiver/transceiver 14, without thus requiring the presence of further dedicated components, for example in order to block or disturb wireless transmission, by means of the transmitting unit and/or transceiver 13, of the recognition data 12 to the control unit mounted in the motor vehicle 2. In particular, advantageously, the key 3 according to the invention does not include any further component dedicated to block or disturb the communication between the transmitting and/or transceiver unit 13 and the control unit 6 mounted in the vehicle 2.

Conveniently, an electric power supply unit for the various components is also conveniently contained inside the containment casing 4 of key 3, preferably a supply battery (not shown).

Advantageously, the electronic key 3 comprises a containment casing 4 which can be provided with and/or associated with at least one button, or other traditional input means, to send a corresponding input signal to the processing and/or control unit 10 of the electronic key.

Advantageously, the electronic key 3 can also comprise a mechanical encryption.

Preferably, the receiver/transceiver 14 of the key 3 is configured to communicate via wireless with the outside, in particular to receive via wireless said command signal 15 from the outside.

In particular, the receiver/transceiver 14 is configured to communicate via wireless with a mobile electronic device 20, such as for example smartphone, tablet, remote control/radio control, etc. Conveniently, the receiver 14 is configured to communicate in reception with the mobile device 20 or it can be configured to also allow a communication in transmission, and thus define a bidirectional communication between the transceiver 14 and the mobile device 20.

Preferably, the receiver and/or transceiver 14 is configured to communicate always and only with the external device 20, and is not able/configured to communicate with the control unit 6 of the motor vehicle 2.

Preferably, the mobile device 20 is managed and/or is available to the user 30 who goes near the motor vehicle 2 to be able to use it temporarily, and which in particular needs to enable key 3 in order to be able to unlock the opening at least one door of the motor vehicle 2 and/or in order to unlock the ignition of the motor vehicle.

Advantageously, in the mobile electronic device 20 are associated, or are incorporated, short-range transmission means (i.e., of the order of ten centimeters up to one meter or a few tens of meters), such as those using NFC technology (from English "Near Field Communication") or transponders for example of the RFID type ("Radio-Frequency IDentification") or, again, transmission means that use the Bluetooth standard. Correspondingly, the receiver/transceiver 14 is configured for short-range reception of the signals sent by the mobile device 20 and, for example, it can be a receiver of the type that uses NFC technology ("Near Field Communication") and/or RFID transponder ("Radio-Frequency IDentification") and/or the Bluetooth standard.

Conveniently, short-range transmission or reception means rely on technologies configured to transmit one-way or two-way communications over short distances and at low power.

Therefore, by approaching the key 3 and the mobile device 20, the key 3 itself is able to acquire—by means of the receiver/transceiver 14—an external command signal 15 which is generated and sent by the mobile device and which is designed to pass the key from the disabled state to the enabled state (and in this case the external command signal 15 acts as an enabling command) or from the enabled state to the disabled state (and in this case the external command signal 15 acts as a disabling command).

Advantageously, in a possible embodiment, an apparatus 40 installed/installable in the motor vehicle 2 is provided. Conveniently, said apparatus 40 can comprise at least a portion thereof which is configured to act as a support base for the key 3; for example, said appliance 40 can act as a support base for the key, a base that can be integrated and fixed inside the passenger compartment or can be removable. Advantageously, said apparatus 40 can act as a battery charger for the key 3; in particular, for this purpose, said device can be connected to the key to recharge the power supply battery of the key by wire and/or wirelessly.

Advantageously, said device 40 installed/installable inside the motor vehicle 2 is configured to be connected to an electric power socket provided in the motor vehicle itself, for example to a cigarette lighter socket (as required by the ANSI/SAE J563 standard) or to a USB socket. Conveniently, said appliance 40 is therefore provided with a corresponding connector for its connection to said electric socket.

Preferably, in a first embodiment, the apparatus 40 is configured to communicate with the key 3 only when the latter is resting and/or is in proximity to the apparatus 40.

Conveniently, the apparatus 40 is configured to communicate with the key 3 only when the latter is resting and/or near the appliance 40, and this in order to allow the key—upon receipt of the external command 15 which is sent to the key 3 directly from the outside—passage from the enabled state to the disabled state; in particular, for example, the passage of the key from the enabled state to the disabled state, which is activated by the external command 15 sent by the external device 20 directly to the key 3, is completed only upon reception by the key 3 of a signal confirms that it is sent by the apparatus 40 to the key itself only when the latter is placed in the vicinity of the apparatus 40. Preferably, the key 3 communicates with the apparatus 40 by means of said at least one transmitting and/or transceiver unit 13, and not by means of the receiver and/or transceiver 14 which is instead configured to communicate always and only with the external device 20.

Conveniently, in said first embodiment, the command signal 15 for passing the key from the disabled state to the enabled state, or vice versa, it never passes through the apparatus 40, but is always and only transmitted directly from the external device to the sensor and/or transceiver 14 of the key 3.

Advantageously, in a further (second) possible embodiment, the receiver/transceiver 14 of the key 3 can be configured to be connected via wire (for example via USB) or via wireless, preferably with short-range communication means, with said apparatus 40 provided/mounted inside the motor vehicle 2. In this way, the receiver/transceiver 14 of the key 3 conveniently communicates—at least in data reception—with said apparatus 40, in particular for receiving said command signal from the outside 15. Conveniently, in said further (second) possible embodiment, the mobile device 20 can transmit the external command 15 to the receiver/transceiver 14 of the key directly or, in another possible version, said external command 15 could be transmitted from mobile device 20 to key 3 by means of said device 40 and in particular In this case, the external command 15 is first sent to said further receiver/transceiver provided in the apparatus 40 and then is sent by the latter to the receiver/transceiver 14 provided in the key 3.

Advantageously, said apparatus 40 can comprise its own processing and/or electronic control unit for data transfer with the control unit 6 of the motor vehicle 2 and/or with the key 3.

Advantageously, said device 40 can comprise a further receiver/transceiver configured to communicate—at least in reception or preferably bidirectionally—with the mobile device 20 so as to exchange data with the latter.

Conveniently, said at least one processing and/or control unit 10 of the key 3 comprises a processor, preferably the CPU of a microprocessor or a microcontroller or a DSP.

Conveniently, said at least one memory unit 11 comprises a data memory which can be non-volatile, for example a ROM or EPROM or EEPROM or flash memory, or even volatile, for example RAM.

Conveniently, two distinct memory units 11' and 11" can be provided inside the containment casing 4 or a single/unique memory unit can be provided. Conveniently, the two distinct memory units 11' and 11" can be mounted on the same electronic board 21 or on two separate electronic boards 21 and 23 connected to each other, or they can be mounted on the same microcontroller or on two separate microcontrollers.

Conveniently, the recognition data 12' to allow/unlock the ignition of the motor vehicle 2 can be stored in a (first) memory unit 11', while the recognition data 12" to allow/unlock the opening of at least one door of the motor vehicle can be stored in the other (second) memory unit 11"; alternatively, both of the aforementioned recognition data 12' and 12" can be stored in the same (single) memory unit 11 provided in said key.

Conveniently, a single memory unit 11 can also be provided inside the key 3 in which only the recognition data 12' is stored to allow/unlock the ignition of the motor vehicle engine or only the recognition data 12" to allow/unlock the opening of at least one vehicle door.

Conveniently, the recognition datum 12" to allow/unlock the opening of at least one motor vehicle door can be the same or different with respect to the recognition datum 12' to allow/unlock the ignition of the motor vehicle engine.

Advantageously, the processing and/or control unit 10 and the memory unit 11 of the key 3 can be implemented in the same microcontroller.

Conveniently, the processing and/or control unit 10 and the memory unit 11 can be implemented on the same electronic card 21, or on two separate electronic cards connected to each other electrically. In particular, an electronic board can be provided in which the memory unit 11' containing the recognition data 12' is mounted to allow/unlock the ignition of the motor vehicle engine, and a further electronic board 23 in which it is mounted a microcontroller provided with the processing and/or control unit 10 and with a further memory unit 11" containing the recognition data 12" to allow/unlock the opening of at least one motor vehicle door.

Conveniently, the receiver/transceiver 14 comprises a receiver or receiver-transmitter module. Preferably, the receiver/transceiver 14 is implemented on an electronic board 21 which is separate, but electrically connected, with respect to that 23 in which said at least one memory unit 11 is mounted.

Advantageously, the receiver/transceiver 14 can comprise a receiver module or receiver-transmitter and also can comprise its own processor, preferably a microcontroller; in particular, in this case the receiver or receiver-transmitter module and the microcontroller are both mounted in the same electronic board 21.

Conveniently, said at least one processing and/or control unit 10 housed inside the housing 4 of the key 3 can be implemented by:

a single microcontroller which also comprises at least one memory unit 11 and/or which is mounted on the same electronic board in which at least one memory unit 11 is mounted, or a single microcontroller which is mounted on the same electronic board where the receiver-transmitter module of the receiver/transceiver 14 is mounted, or two microcontrollers, one of which is mounted on the same electronic board in which at least one memory unit 11 is mounted while the other microcontroller is mounted on the same electronic board in which the receiver-transmitter module of the receiver/transceiver 14 is mounted.

Advantageously, the receiver/transceiver 14, the processing and/or control unit 10 and the memory unit 11 can be implemented in the same electronic board, or in separate electronic boards electronically connected to each other.

Preferably, said at least one transmitting and/or transceiver unit 13 is configured to communicate with a control unit 6 provided/mounted inside the motor vehicle 2, and in particular it is configured to send to the control unit 6 provided/mounted inside the motor vehicle said at least one recognition datum 12' to allow/unlock the ignition of the motor vehicle engine and/or said at least one recognition datum 12" to allow/unlock the opening of at least one motor vehicle door.

Conveniently, the key 3 comprises a receiver/transceiver 14 which is provided with a receiver or receiver-transmitter module configured for communication with the external device 20, and said receiver or receiver-transmitter module is distinct and additional with respect to that of said at least transmitter and/or transceiver unit 13 which is instead configured to communicate with the control unit 6 provided/mounted inside the motor vehicle. Basically, inside the key 3 there is a module of at least one transmitting and/or transceiver unit 13, which is dedicated only to communication with the control unit 6 of the vehicle, and at least one (distinct and further) module of the receiver/transceiver 14, which is dedicated only to communication with the external device 20, preferably portable.

Conveniently, a single transmitter and/or transceiver unit 13 can be provided to send to the control unit 6 provided/mounted inside the vehicle both the recognition data 12' to allow/unlock the ignition of the motor vehicle engine and the recognition datum 12" to allow/unlock the opening of at least one vehicle door. Alternatively, two distinct transmitter and/or transceiver units 13' and 13' can be provided, each preferably connected to a respective memory unit 11' or 11", and of which a transmitter and/or transceiver unit 13' is configured to send the recognition data 12' to the control unit provided/mounted inside the vehicle to allow/unlock the ignition of the vehicle engine, while the other 13" is configured to send to the control unit provided/mounted to the inside the vehicle the recognition datum 12" to allow/unlock the opening of at least one door of the motor vehicle.

Advantageously, said at least one transmitter and/or transceiver unit 13 with a corresponding memory unit 11 can thus define a transponder, preferably of the type configured to unlock the ignition of the motor vehicle engine. In particular, preferably, said transponder is of the type traditionally used in immobilizers of motor vehicles.

Conveniently, at least one transmitter and/or transceiver unit 13 is configured to transmit one or more signals—comprising the recognition data 12 contained in the memory unit 11, or consisting of said data—to the motor vehicle control unit 6 and to receive one or more signals from said control unit. Conveniently, the electronic control unit 6 of the motor vehicle—and preferably the immobilizer of the motor vehicle—is connected to the ignition lock of the motor vehicle itself.

Conveniently, said recognition datum 12 comprises a unique code for each motor vehicle and, advantageously, it can be a fixed or variable code (also called "rolling", i.e., of the type that varies each time the motor vehicle is turned on).

Conveniently, said at least one transmitter and/or transceiver unit 13 of the key 3 is configured in such a way that, once it is activated, it sends the recognition data 12—and therefore the univocal code—present in the memory unit 11 and such code is detected by an antenna connected to the car's control unit 6. Conveniently, if the code thus detected is recognized as valid, the engine control unit is activated and, therefore, the vehicle can be started.

Conveniently, said at least one recognition datum 12' may be able to communicate with the control unit 6 located on board the car in order to recognize the key 3 and, advantageously, to also be recognized by it, thus carrying out a mutual authentication.

Preferably, said electronic key 3 is configured to operate according to the "smart-key" system and also known as "keyless go" (or "Keyless Go Smartkey").

Advantageously, inside the key 3 there is also a unit 17 configured to allow to detect and/or communicate whether the key is inside or outside the motor vehicle 2. Conveniently, this unit 17 is of the traditional type and includes a 3D antenna (which conveniently transmits and receives the electromagnetic field in all three dimensions X, Y and Z), preferably at low frequency, and is configured to detect and measure the intensity of the electromagnetic field (i.e. radio signal) in all three directions; in particular, for this purpose, such unit can comprise a low frequency electronic amplifier circuit and a processor configured to measure in reception the intensity of the electromagnetic field (i.e. of the radio signal) in all three directions. Advantageously, as mentioned, the electronic apparatus 40 can be equipped with means for detecting whether or not the key 3 is in contact with or near the apparatus itself (for example at a support base defined by the apparatus itself); suitably, these means provide for the detection of the recharging current, or provide for the use of an electric contact or a photocell, or in general other traditional contact or proximity sensors.

In particular, inside the casing 4 of the key 3, the following can be housed:

a transmitting and/or transceiver unit 13 of high frequency radio signals, for example greater than 300 MHz, and a receiving component 1—forming part of unit 17 configured to allow detecting and/or communicating whether the key is inside or outside the vehicle 2—to receive radio signals at low frequencies (preferably at 125 kHz and/or 134 KHz) sent by the vehicle control unit.

In a corresponding manner, in the motor 2 and/or into the 40 is provided:

a transmitter and/or transceiver unit of high frequency radio signals, for example greater than 300 MHz, a low frequency radio signal generator and transmitter module (preferably at 125 kHz and/or 134 KHz) to transmit a corresponding signal to the key.

Conveniently, the antennas 8 are mounted on the motor vehicle 2 to receive/transmit radio signals from/to the key. In particular, said antennas 8 can be mounted inside the passenger compartment of the motor vehicle and/or the luggage compartment and/or the luggage compartment.

Conveniently, receiving/transmitting antennas 8 and/or contact and/or proximity sensors 7, preferably capacitive type, are mounted on board the motor vehicle 2, in particular at the doors, and preferably integrated in the doors. Conveniently, the receiving/transmitting antennas 8 and/or the contact and/or proximity sensors 7 are electronically connected to the control unit 6 of the motor vehicle.

In particular, when a user approaches the motor vehicle 2 and/or touches a door handle (i.e., when he enters the range of action of the proximity and/or contact sensors 7), the control unit 6 of the motor vehicle sends a signal interrogation, activated by the detection carried out by said sensors 7, to the electronic key 3 and receives a response signal from the latter.

Preferably, the interrogation signal sent by the control unit 6 of the motor vehicle 2 to the key 3 is at low frequency (for example with carrier frequency 125 KHz), while the response signal sent by the electronic key 3 to the motor vehicle 2 is at high frequency (for example with a frequency greater than 300 MHz). Conveniently, said interrogation signal contains the data to be transferred from the control unit 6 to the key 3 and, furthermore, the latter detects the intensity of the received signal by means of the 3D antenna and then generates and sends to the control unit 6 a corresponding signal used by the latter to locate the key 3, and above all to establish whether the key itself is inside or outside the motor vehicle 2. Advantageously, this procedure can be envisaged to unlock both the opening of the doors and the ignition of the engine.

Advantageously, if the apparatus 40 is provided inside the motor vehicle 2, the presence of the key 3 inside the motor vehicle 2 can be ascertained through the means of said apparatus 40 provided for detecting whether the key 3 is located in contact with or near the apparatus itself or not.

Preferably, in a first possible embodiment (see FIG. 4) of the key 3, inside the housing of the latter, the following is provided:

an electronic board 21 in which a processing and/or control unit 10 (defined by a microcontroller) and a receiver/transceiver 14 are mounted to communicate with the external mobile device 20 and/or a further external device 40;

a transponder 22 which is provided with a memory unit 11 and a transmitter or transceiver unit 13 to communicate with the control unit 6 of the motor vehicle, in particular to send the recognition data 12 contained in said memory unit to said control unit 11.

Conveniently, the electronic card 21—and in particular the processing and/or control unit 10—is electronically connected to the transponder 22.

Preferably, the recognition data 12' is contained within the memory unit 11. to allow/unlock the ignition of the vehicle engine.

In a second possible embodiment (see FIG. 5) of the key 3, inside the casing 4 of the latter, the following is provided:

an electronic board 21 in which a receiver/transceiver 14 is mounted to communicate with the external mobile device 20 and/or another external device 40;

a transponder 22 which is provided with a first memory unit 11' and with a first transmitter or transceiver unit 13' to communicate with the control unit 6 of the motor vehicle, in particular to send to said control unit 6 the recognition data 12' contained in said first memory unit 11'.

a further electronic board 23 in which a processing and/or control unit 10 is mounted (defined by a first microcontroller), a second memory unit 11", a second transmitter or transceiver unit 13' to communicate with the control unit 6 of the motor vehicle, in particular for sending the recognition data 12" contained in said second memory unit 11" to said control unit.

Optionally, a further processing and/or control unit (not shown), which can be defined by a further microcontroller, can be mounted on the electronic board 21 of the receiver/transceiver 14.

Conveniently, said further electronic card 23 (and in particular the processing and/or control unit 10) is electronically connected with the electronic card 21 of the receiver/transceiver 14 and with the transponder 22. Optionally, if the electronic card 21 of the receiver/transceiver 14 is provided with a further processing and/or control unit, then also said electronic card 21 can be connected with the transponder 23.

Preferably, inside the first memory unit 11' (i.e., that of the transponder 22) is the recognition data 12' is contained to allow/unlock the ignition of the motor vehicle engine, while the recognition data 12' is contained within the second memory unit 11" (i.e., that of the further electronic board 23 to allow/unlock the opening of at least one vehicle door.

In a third possible embodiment (see FIG. 6) of the key, inside the casing 4 of the latter, the following is provided:

an electronic board 21 in which a receiver/transceiver 14 is mounted to communicate with the external mobile device 20 and/or another external device 40;

a further electronic board 23 in which a processing and/or control unit 10 (defined by a microcontroller), a memory unit 11, a transmitter or transceiver unit 13 is mounted to communicate with the control unit 6 of the motor vehicle, in particular for send to said control unit the recognition data 12' and 12" contained in said memory unit 11.

Optionally, on the electronic board 21 of the receiver/transceiver 14 a further processing unit and/or control (not shown), which can be defined by an additional microcontroller.

Conveniently, said further electronic board 23 (and in particular the processing and/or control unit 10) is electronically connected to the electronic board 21 of the receiver/transceiver 14.

Preferably, inside the single memory unit 11 provided in this embodiment contains both the recognition datum 12" to allow/unlock the opening of at least one vehicle door and the recognition datum 12' to allow/unlock the ignition of the motor vehicle engine.

In a fourth possible embodiment (see FIG. 7) of the key, inside its casing, a single electronic card 21 is provided in which are mounted:

a processing and/or control unit 10 (defined by a microcontroller), a receiver/transceiver 14 for communicating with the external mobile device 20 and/or a further external device 40.

a memory unit 11, a transmitting or transceiver unit 13 for communicating with the control unit 6 of the motor vehicle, in particular for sending the recognition data contained in said memory unit 11 to said control unit 11.

Preferably, within the single unit memory 11 (i.e., that of the first electronic board) provided in this embodiment, contains both the recognition data 12" to allow/unlock the opening of at least one motor vehicle door and the recognition data 12' for allow/unlock the ignition of the vehicle engine.

In a fifth possible embodiment (see FIG. 8) of the key, the latter is configured to operate according to the "smart-key" system and also known as "keyless go" (or "Keyless Go Smartkey"). In particular, inside the casing 4 of the key 3, there is:

an electronic board 21 in which a receiver/transceiver 14 is mounted to communicate with the external mobile device 20 and/or another external device 40;

a further electronic board 23 in which a processing and/or control unit 10 (defined by a microcontroller), a memory unit 11, a transmitter or transceiver unit 13 is mounted to communicate with the control unit 6 of the motor vehicle, in particular for send to said control unit the recognition data 12' and 12" contained in said memory unit 11.

an electronic unit 17 for detecting and/or communicating whether the key is inside or outside the motor vehicle; in particular, for this purpose, a receiving component 19 is provided (which is provided with a 3D antenna) to measure in reception the intensity in all three directions of at least one radio signal (preferably at low frequency) which is sent by the control unit 6 of the motor vehicle and which is activated by the contact and/or proximity sensors 7 of said motor vehicle; optionally, the receiving component 19 can comprise its own microcontroller and/or can use the microcontroller provided in the other electronic boards; suitably, once the receiving component 19 has received the radio signal sent by the control unit 6 of the motor vehicle, it activates/wakes the processing and/or control unit 10 which thus sends a corresponding signal (preferably at high frequency) to the control unit 6 in order to unlock the doors and thus allow them to be opened.

Conveniently, said further electronic board 23 (and in particular the processing and/or control unit 10) is electronically connected to the electronic board 21 of the receiver/transceiver 14.

Preferably, inside the single memory unit 11 provided in this embodiment contains both the recognition datum 12" to allow/unlock the opening of at least one vehicle door and the recognition datum 12' to allow/unlock the ignition of the motor vehicle engine.

In a sixth possible embodiment (see FIG. 9) of the key, the latter is configured to operate according to the "smart-key" system and also known as "keyless go" (or "Keyless Go Smartkey") and is a single electronic board 20 is provided in which are mounted:

a processing and/or control unit 10 (defined by a microcontroller), a receiver/transceiver 14 for communicating with the external mobile device 20 and/or a further external device 40.

a memory unit 11, a transmitting or transceiver unit 13 for communicating, preferably at high frequencies, with the control unit 6 of the motor vehicle, in particular for sending the recognition data 12' and/or 12" contained in said control unit memory unit 11, an electronic unit 17 for detecting and/or communicating whether the key is inside or outside the motor vehicle; in particular, for this purpose, a receiving component 19 is provided (which is provided with a 3D antenna) to measure in reception the intensity in all three directions of at least one radio signal (preferably at low frequency) which is sent by the control unit 6 of the motor vehicle and is activated by the contact and/or proximity sensors 7 of said motor vehicle.

Preferably, inside the single memory unit 11 provided in this embodiment, both the recognition data 12" to allow/unlock the opening of at least one motor vehicle door and the recognition data 12' are contained to allow/unlock the ignition of the vehicle engine.

Conveniently, the present invention also relates to an infrastructure—indicated as a whole with the reference number 1—for managing a plurality of motor vehicles 2 so as to temporarily allow at least one user 30 to use one of said motor vehicles 2, in particular so as to unlock the opening of at least one door of one of said motor vehicles and/or unlock the ignition of the motor vehicle 2.

In particular, the infrastructure 1 comprises:

at least one remote unit 24, at least one mobile device 20 which communicates and interfaces with the remote unit 24 and with at least one electronic key 3, a plurality of electronic keys 3, as described above, each of which communicates and interfaces with the mobile device 20 and with at least one control unit 6 on board the motor vehicle; suitably, said electronic key 3 is configured to pass from the disabled state to the enabled state, or vice versa, following the receipt of an external command signal 15 sent by a mobile device 20, a plurality of control units 6, each of which is mounted on board a motor vehicle 2 and which is configured to unlock the opening of at least one door of the corresponding motor vehicle and/or to unlock the ignition of the motor vehicle following reception of said at least one recognition datum of a given key 3.

Conveniently, the remote unit 24 is configured to send an activation signal 31 to said mobile device 20 and said mobile device 20 is configured so that, upon receiving said activation signal 31, sends an external command signal 15 directly to a certain key 3 to make it pass from the disabled state to the enabled state, and thus allow said user 30 to successfully use said certain key 3 to unlock the opening of at least one door of the corresponding motor vehicle and/or to unlock the ignition of its engine.

Conveniently, the remote unit 24 is configured to send a deactivation signal 32 to said mobile device 20 and said mobile device 20 is configured so that, upon receiving said deactivation signal 32, it sends an external command signal 15 to a certain key 3 to make it pass from the enabled state to the disabled state, and thus prevent said user 30 from successfully using said certain key 3 to unlock the opening of at least one door of the corresponding motor vehicle and/or to unlock the ignition of its engine.

In particular, the remote unit 24 comprises at least one memory with a corresponding processor 25, which for example is defined by one or more real or virtual remote computers and/or servers. Conveniently, the remote unit 24 can be defined by a real computer or server provided within or in the vicinity of a parking/collection area 2, or it can be defined by a computer or server, both real and virtual, located at a distance (even considerable) from the parking/collection area/s of the vehicles.

Preferably, said remote unit 24 comprises a central storage and/or processing unit to which a plurality of (i.e., at least two) mobile devices 20 are connected.

Advantageously, the mobile device 20 is provided with communication means 28 of the wireless type with the remote unit 24. Conveniently, the means of communication 28 between the mobile device 20 and the remote unit 24 can use the technology of cellular mobile telephony (with standards such as GMS, UMTS, GPRS, etc.) and/or the internet. Preferably, the communication means 28 use secure communication protocols, such as, for example, the TLS or SSL protocols.

Preferably, when the mobile device 20 is constituted by a smartphone or tablet, a suitable mobile software application (APP) configured to allow communication and/or exchange of data directly between the device itself and the remote unit 24, as well as between the mobile device 20 and the key 3.

Conveniently, a software configured to send an activation 31 or deactivation signal 32 to the mobile device 20 is conveniently loaded and executed in the remote unit 24 by means of communication means 28.

Conveniently, in the mobile device 20 is loaded and executed a software module configured so that, upon receipt by the remote unit 24 of a corresponding activation signal 31, it sends the key 3 receiver/transceiver 14 an external control signal 15 to thus make the key pass from the disabled state to the enabled state. Advantageously, the software module loaded and executed in the mobile device 20 is configured so that, upon receipt by the remote unit 24 of a corresponding deactivation signal 32, it sends a command signal to the receiver/transceiver 14 of the key 3 external 15 to thus pass the key from the enabled state to the disabled state.

Conveniently, the activation signal 31 can be a different signal than the deactivation signal 32; alternatively, the activation 31 and deactivation 32 signals can be the same and be used as a "switch" signal/command to pass the key from the state (i.e., enabled or disabled) in which it is before the signal to the other state (i.e., disabled or enabled).

Advantageously, the software loaded and executed in the remote unit 24 and the software module loaded and executed in the mobile device 20 are configured to interact so as to implement a procedure for registering a user 30, who preferably but not necessarily is the owner and/or manager of said mobile device.

Advantageously, the software loaded and executed in the remote unit 24 and the software module loaded and executed in the mobile device 20 are configured to interact so as to implement a control and authorization procedure for a certain user 30 (which preferably but not necessarily is the owner and/or manager of said mobile device) to be able to use a motor vehicle. Preferably, the control/authorization procedure of a certain user 30 can also comprise an online economic transaction.

Advantageously, the software loaded and executed in the remote unit 24 is configured to send the activation signal 31 to the mobile device 20 only in the event of a positive outcome of the control and authorization procedure of a certain user 30; suitably then the mobile device 20, upon receipt of the activation signal 31, sends to the key 3 the external command signal 15 for enabling to thus pass said key from the disabled state to the enabled state.

Advantageously, this allows the authorization of a user 30 to use a motor vehicle to be managed in a substantially automatic, streamlined and fast manner, thus allowing the user to use the key 3 to unlock the doors, and thus access the interior of the vehicle passenger compartment, and/or to unlock the ignition of the engine.

Conveniently, key 3 can be in the enabled or disabled state by default.

Advantageously, the software of the remote unit 24 is configured to associate to an activation signal 31—which is sent to a specific mobile device 20 and is related to a given key 3 and/or motor vehicle 2—a time interval (duration) for its validity (for example a few hours or days or weeks) so that, after said interval, the software of the remote unit 24 generates and automatically sends a deactivation signal to the mobile device 20, which then automatically and directly sends to the key an external disabling command for thus passing said key from the enabled state to the disabled state, thus preventing the user from continuing to use the vehicle.

Advantageously, the software module of the mobile device 20 is configured to associate a time interval (duration) for its validity (for example a few hours or days or weeks) to an external command signal 15 for enabling a certain key 3 so that once this interval has elapsed, the software module of the mobile device 20 automatically sends to the key 3 an external disabling command 15 to thus pass said key from the enabled state to the disabled state, thus preventing the user from continuing to use the motor vehicle 2.

Advantageously, this allows to manage in a substantially automatic manner, lean and fast interruption of the authorization of a user to use a machine, thus preventing the user 30 to use the key to unlock the doors, and that in order enter the passenger compartment, and/or to unlock the engine ignition.

The operation of the infrastructure 1 envisages a sequence of steps which are listed and described below.

Advantageously, a user 30—preferably by means of his mobile device 20—previously carries out a step of recording his identification and/or contact data at the remote unit. Eventually, this registration phase could also be done by physically going to an appropriate counter/desk or shop managed by a dedicated and/or automatically managed operator.

The user 30, who owns and manages the mobile device 20, acts on the latter to send a request to the remote unit 24 and thus start a procedure for checking and authorizing said user, possibly also requesting an online economic transaction.

Conveniently, the key in its disabled state can be picked up by the user directly inside the vehicle 2 (if the passenger compartment doors have not been locked) or from a kiosk (automated or managed by an operator), preferably in the vicinity of the motor vehicle 2.

Therefore, in the event of a positive outcome of the control and authorization procedure, the remote unit 24 sends an activation signal 31 to the mobile device 20; conveniently, upon receipt of said activation signal 21, the mobile device 20 sends an external command signal 15 to enable the electronic key 3—which has been withdrawn by the user 30 and which is in the disabled state—so as to make it pass from said disabled state to an enabled state. Advantageously, in the case of doors locked for access to the passenger compartment, the external control signal 15 in addition to enabling the key 3 can also instruct the latter to send the recognition data 12 to unlock the opening of said doors.

Once the key 3—following receipt of the external enabling command—has passed to the enabled state, it can then be used to unlock the doors of the motor vehicle 2, to thus access the passenger compartment or luggage compartment, and/or to unlock the ignition of the motor vehicle itself. In particular, once the key 3 has passed to the enabled state, the key itself can therefore be used first to unlock the doors of the motor vehicle 2, to allow the user to access the passenger compartment, and subsequently to unlock the ignition of the motor vehicle itself.

Advantageously, following the passage of the key 3 from the disabled state to the enabled state and/or when the key is in the enabled state, the latter can communicate directly with the mobile device 20, which in turn can communicate with the unit remote 24. For example, the key 3 can send to the mobile device 20 a signal to indicate its correct enabling status, and then said mobile device 20 sends the same or another signal to the remote unit 24 to communicate to said remote unit 24 the correct enabling status of the key. Correspondingly, the key 3 can send a signal to the mobile device 20 to indicate a particular or anomalous event (for example relating to the state of charge of the key batteries, the possible need for refueling, a non-working light bulb, to check the pressure of a tire, at the expiry of the coupon and/or test, etc.), and then said mobile device 20 sends the same or another signal to the remote unit 24 to communicate to said remote unit 24 that a particular or abnormal event.

Conveniently, at the end of the use of the motor vehicle 2 by the user 30, the latter switches off the motor vehicle engine, gets out of the passenger compartment and locks the doors of the motor vehicle. At this point, therefore, the user can act on the mobile device 20 so that the latter sends to the electronic key 3—which is in the enabled state—an external control signal 15 for disabling so as to make it pass from said enabled state to a disabled state.

Conveniently, after a predefined time interval has elapsed, which corresponds to the period in which the user is validly authorized to use a vehicle 2, and which is calculated starting from a specific event (which for example is defined starting from the moment in which the remote unit 24 has sent the activation signal 31 to the mobile device 20), the mobile device 20 automatically sends to the electronic key 3—which is in the enabled state—an external command signal 15 for disabling to make it pass from said enabled state to a disabled state.

In particular, as said, when it is in its disabled state, the key 3 cannot unlock the doors of the motor vehicle 2 and/or cannot unlock the ignition of the engine, thus making the vehicle substantially unusable for the user.

Preferably, to be sure that the key 3 to be disabled is inside the motor vehicle 2, the key itself can be configured to pass from the enabled state to the disabled state following the receipt of an external disabling command signal 15 coming directly by the mobile device 20 in combination, however, with the reception of a further external disabling command which is transmitted to the key by the short-range transmission means of said device 40 provided inside the motor vehicle 2.

Conveniently, the present invention has been described in particular with reference to unlocking the vehicle doors, and this in order to access the passenger compartment, and to unlocking the engine ignition, however it is understood that the same key, infrastructure and method could also be provided to enable/disable other functions provided inside the vehicle, such as for example the use of the car radio and/or reaching a maximum speed limit.

The remote unit 24 can be implemented according to various embodiments of digital computers, such as laptops, desktops, workstations, handheld computers (PDAs), servers, blade servers, cloud servers, mainframe computers and other suitable computers.

The mobile device 20 can be implemented by means of fixed computers, laptops, handheld computers (PDAs), smartphones, tablets, notebooks, netbooks, ultraportable computers (UMPCs), carputers and other similar devices.

Preferably, in the infrastructure 1 according to the invention the mobile devices 20 act as a client while the remote unit 24 acts as a server. Conveniently, the clients and the server are generally far from each other and generally interact through a communication network and, preferably, always and only interact through the Internet. The relationship between client and server is implemented by means of suitable computer programs running on the respective processors and having client-server relationships between them.

The present invention also relates to a method for enabling/disabling a key as described above in which a mobile device 20 is operated to send at least one external control signal 15 directly to said key 3 to thus make it pass from the disabled to the enabled state, or vice versa.

The solution according to the invention is particularly advantageous in that:
  acts only on the key, making it pass from the disabled state to the enabled state, or vice versa, thus avoiding any dedicated or specific interventions or modifications on board the vehicle, and in particular on its control unit,
  the authorization procedure for the use of a vehicle is highly automated and can be carried out remotely; in particular, this allows the user who requests the temporary use of a vehicle to avoid having to physically go to a dedicated counter/desk or shop and also allows the operator of a fleet of motor vehicles not to employ dedicated operators; in this way, therefore, the whole procedure becomes simpler, faster and less expensive,
  it is simple and intuitive to use as most of the steps are carried out automatically,
  uses means that are already widely available on the market and of accessible cost,
  is simple and easy to implement,
  it is particularly safe because, in the absence of the temporary authorization to use the vehicle, it allows the key to be disabled remotely, thus preventing the user from unlocking the vehicle doors and/or unlocking the ignition of the engine, effectively preventing him from continuing to use the vehicle,
  enabling/disabling the key allows to counter and protect the user from the theft method called "relay attack" and this without requiring the installation of particularly expensive dedicated chips inside the key and also without requiring the key to be inserted in special cases of special fabrics.

Conveniently, the solution according to the present invention can be used on motor vehicles already present on the market and also on original or "OEM" motor vehicles. In particular, the solution according to the present invention makes it possible to avoid having to equip a vehicle, in particular of the "OEM" type, with control units (and related software) for remote control of access and/or ignition of the vehicle; these control units, besides being particularly expensive and complicated to manage, are dedicated and are different from the control units mounted on motor vehicles for which no remote control of access and/or ignition is required.

The invention claimed is:

1. Electronic key (3) for use with a motor vehicle (2), the electronic key (3) comprising a containment casing (4), the containment casing (4) comprising, housed therein:
  at least one of a processing unit or control unit (10),
  at least one memory unit (11, 11', 11") in which at least one recognition data (12, 12', 12") is stored to control at least one function and/or system of the motor vehicle (2),
  at least one transmitter and/or transceiver unit (13) to communicate with at least one control unit (6) which is mounted in or on said motor vehicle (2) and which is configured to command, following the receipt of said at least one recognition data (12, 12', 12"), at least one functionality and/or system of the vehicle,
  at least one receiver or transceiver (14) which is connected to at least one of the processing unit or control unit (10) and is configured to receive at least one command signal (15) directly from outside the vehicle,
  wherein at least one of said at least one processing unit or control unit (10) is configured so that, upon receipt, via said at least one receiver or transceiver (14), of said at least one command signal (15) directly from outside the vehicle, intervenes on at least one of said components of the electronic key itself so as to at least one of: make said electronic key switch from:
  an enabled state, in which the electronic key communicates, via said at least one transmitting and/or transceiver unit (13), said at least one recognition data (12, 12', 12") to said at least one control unit (6) mounted in or on said motor vehicle (2), to successfully control at least one function and/or system of said motor vehicle (2), to
  a disabled state, in which the electronic key is unable to at least one of:
  communicate with said at least one control unit (6) mounted in or on said vehicle (2) or does not communicate said at least one recognition data (12, 12', 12") to said at least one control unit (6), preventing control of at least one of: said at least one functionality or system of the motor vehicle (2), or for passing said key (3) from said disabled state to said enabled state, and wherein said at least one processing or control unit (10) is configured to, following receipt by at least one receiver or transceiver (14) of said command signal (15) from outside the vehicle, pass said key from the enabled state to the disabled state by deleting or modifying, at least in part, one or more instructions of firmware of at least one of: said at least one memory unit (11), said at least one processing unit, said control unit (10), said at least one transmitter unit or transceiver unit (13), said at least one receiver or transceiver (14).

2. The electronic key according to claim 1, wherein said receiver or transceiver (14) is configured to communicate wirelessly, directly with a mobile electronic device (20), to thus receive from said mobile electronic device (20) said at least one command signal from outside the vehicle (15).

3. The electronic key according to claim 1, wherein said receiver or transceiver (14), which is configured to communicate via wireless directly and only with a mobile electronic device (20), comprises a module which is different and further with respect to that of at least one of said at least one transmitting or transceiver unit (13) which is instead configured to communicate only with said at least one control unit (6) which is mounted in or on said motor vehicle (2).

4. The electronic key according to claim 1, wherein said receiver or transceiver (14) is configured so as not to communicate and/or so as not to be able to communicate with the control unit (6) which is mounted in or on said vehicle (2).

5. The electronic key according to claim 1, wherein said at least one processing and/or control unit (10) is configured so that, upon receipt by at least one receiver/transceiver (14) of said control signal (15) from outside the vehicle, in order to pass said key from the enabled state to the disabled state, carries out an operation of cancellation and/or an operation of modification, at least partially, of the configuration and/or of connections or of the data present and/or used by at least one of: said at least one processing unit, said control unit (10), said at least one memory unit (11), said at least one transmitter unit, said transceiver unit (13) or said receiver/transceiver (14).

6. The electronic key according to claim 1, wherein at least one of: said at least one processing or control unit (10) is configured so that, following receipt by at least one receiver or transceiver (14) of said command signal (15) from outside the vehicle, further carries out at least one of the following operations to pass said key from the enabled state to the disabled state:

at least one of: erases or modifies, at least in part, said recognition data (12) contained in said at least one memory unit (11), at least one of: interrupts or modifies the electrical connections at least one of: in said at least one processing unit, control unit (10), in at least one memory unit (11), in at least one transmission unit, transceiver unit (13), in said at least one receiver or transceiver (14), or between at least one of: interruptions or modifications of the electrical connections between said components.

7. The electronic key according to claim 1, wherein at least one of: said at least one processing or control unit (10) is configured so that, upon receipt by at least one receiver or transceiver (14) of said control signal (15) from outside the vehicle, in order to pass said key from the disabled state to the enabled state, restores at least one of: the configuration, the connections, the data present, or the data used by at least one of said at least one processing unit control unit (10), from said at least one memory unit (11), from said at least one transmitter unit, transceiver unit (13), from said receiver or transceiver (14).

8. The electronic key according to claim 1, further comprising a transponder comprising at least one of a transmitting unit or transceiver unit (13) with a corresponding memory unit (11) in which at least one of: an identification data is stored (12') to allow or unlock an ignition of the motor vehicle engine (2); or an identification data (12") to allow or unlock at least one vehicle door (2).

9. The electronic key according to claim 1, further comprising:

a single memory unit (6) in which an identification data (12') is stored to allow or unlock the ignition of the motor vehicle engine (2) and an identification data (12") to allow or unlock at least one door of the motor vehicle (2), wherein at least one of said at least one processing or control unit (10) comprises a processor, a CPU of a microcontroller or a DSP.

10. The electronic key according to claim 1, wherein said receiver or transceiver (14) is mounted on an electronic board (21) separate from that (23) in which said at least one memory unit (6) is mounted.

11. The electronic key according to claim 1, further comprising a unit (17) which is configured to allow at least one of detection or communication whether the key is inside or outside the motor vehicle (2).

12. A method to enable or disable a key according to claim 1, wherein the method acts on a mobile device (20) for sending at least one external command signal (15) directly to said key (3) to make the key (3) pass from the disabled to the enabled state, or vice versa.

13. Method for managing temporary use of a motor vehicle (2), wherein a key according to claim 1 is used and wherein a mobile device (20) is used to send at least an external control signal (15) directly to said key (3) to thus make the key (3) pass from the disabled to the enabled state, or vice versa.

14. Infrastructure (1) to manage use of a plurality of motor vehicles (2) so as to temporarily allow at least one user (30) to use one of said motor vehicles said infrastructure comprising:

at least one remote central unit (24), at least one mobile device (20) which is managed by said at least one user (30), a plurality of keys (3) according to claim 1, a plurality of control units (6), each of which is mounted in one of said motor vehicles (2) and which is configured to at least one of: unlock the opening of at least one door of the corresponding motor vehicle or to unlock the ignition of the motor vehicle following the receipt of said at least one identification data of a given key (3), wherein:

said remote unit (24) is configured to send an activation signal (31) to said mobile device (20), said mobile device (20) is configured in such a way that, upon receiving said activation signal (31), it sends an external command signal (15) directly to a certain key (3) to make it pass from the disabled state to the state enabled state, and thus allowing said at least one user (30) to successfully use said specific key (3) to unlock the opening of at least one door of the corresponding motor vehicle and/or to unlock the ignition of its engine.

15. The infrastructure according to claim 14, wherein each control unit (6) of the motor vehicle (2) is and always remains in an enabled state while only said keys (3) pass from said disabled state to said enabled state, or vice versa.

16. The infrastructure according to claim 14, wherein:
    said remote unit (24) is configured to send a deactivation signal (32) to said mobile device (20),
    said mobile device (20) is configured so that, upon receiving said deactivation signal (32), the mobile device (20) sends an external command signal (15) directly to a certain key (3) to make the certain key (3) pass from the enabled state to the disabled state, and thus preventing said user (30) from successfully using said specific key (3) to unlock the opening of at least one door of the corresponding motor vehicle and/or to unlock the ignition of its engine.

17. The infrastructure according to claim 16, wherein at least one of:
    said remote unit (24) automatically sends said deactivation signal (32) to said mobile device (20), after a predefined time interval has elapsed, or
    said mobile device (20) automatically and directly sends said external command signal (15) to said key (3) to make the key (3) pass from the enabled state to the disabled state after a predefined time interval has elapsed.

* * * * *